(12) United States Patent
Kim et al.

(10) Patent No.: US 9,063,592 B2
(45) Date of Patent: Jun. 23, 2015

(54) DISPLAY APPARATUS AND METHOD FOR PORTABLE TERMINAL

(75) Inventors: Min-Soo Kim, Gyeongsangbuk-do (KR); Seung-Hyun Park, Gyeonggi-do (KR); Woong-Seok Yang, Gyeongsangbuk-do (KR); Eui-Jeong Kim, Gwangju (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 361 days.

(21) Appl. No.: 13/065,269

(22) Filed: Mar. 18, 2011

(65) Prior Publication Data

US 2011/0227855 A1 Sep. 22, 2011

(30) Foreign Application Priority Data

Mar. 19, 2010 (KR) ........................ 10-2010-0024787

(51) Int. Cl.
| | |
|---|---|
| G06F 3/02 | (2006.01) |
| G06F 3/041 | (2006.01) |
| G02F 1/133 | (2006.01) |
| G02F 1/1333 | (2006.01) |
| G06F 3/0488 | (2013.01) |
| G06F 1/16 | (2006.01) |

(52) U.S. Cl.
CPC .............. *G06F 3/041* (2013.01); *G06F 1/1652* (2013.01); *G02F 1/13306* (2013.01); *G02F 1/133305* (2013.01); *G06F 3/04886* (2013.01); *G06F 2203/04102* (2013.01)

(58) Field of Classification Search
CPC ..... G06F 1/1652; G06F 9/301; H04M 1/0268

USPC ............ 345/156, 169, 173; 455/566; 361/679.04, 679.06, 379.27, 649.29
See application file for complete search history.

(56) References Cited

U.S. PATENT DOCUMENTS

| | | | | |
|---|---|---|---|---|
| 5,881,299 | A * | 3/1999 | Nomura et al. | 713/324 |
| 6,870,322 | B1 * | 3/2005 | Mizukoshi et al. | 315/169.1 |
| 7,006,077 | B1 * | 2/2006 | Uusimaki | 345/173 |
| 2002/0042853 | A1 * | 4/2002 | Santoh et al. | 710/8 |
| 2003/0169247 | A1 * | 9/2003 | Kawabe et al. | 345/204 |
| 2004/0085303 | A1 * | 5/2004 | Yabuuchi | 345/204 |
| 2005/0176470 | A1 * | 8/2005 | Yamakawa | 455/566 |
| 2007/0080905 | A1 * | 4/2007 | Takahara | 345/76 |
| 2007/0206238 | A1 * | 9/2007 | Kawai | 358/482 |
| 2008/0150885 | A1 * | 6/2008 | Overwijk et al. | 345/107 |
| 2010/0164973 | A1 * | 7/2010 | Huitema et al. | 345/581 |
| 2012/0069503 | A1 * | 3/2012 | Lauder et al. | 361/679.01 |

FOREIGN PATENT DOCUMENTS

JP 2003295291 A * 10/2003

* cited by examiner

*Primary Examiner* — Koosha Sharifi-Tafreshi
(74) *Attorney, Agent, or Firm* — Cha & Reiter, LLC

(57) ABSTRACT

A display apparatus for a portable terminal includes an expandable flexible display unit, a sensing unit including of a plurality of magnets and a plurality of sensors sensing the magnets to sense an amount of display unit area accommodated in an accommodation unit of the display unit, and a controller setting pixel values according to sensed amount of the display unit area.

16 Claims, 3 Drawing Sheets
(1 of 3 Drawing Sheet(s) Filed in Color)

DISPLAY APPARATUS AND METHOD FOR PORTABLE TERMINAL

CLAIM OF PRIORITY

This application claims the priority under 35 U.S.C. §119(a) of applications entitled "Display Apparatus And Method For Portable Terminal" filed in the Korean Intellectual Property Office on Mar. 19, 2010 and assigned Serial Nos. 10-2010-0024787, the contents of which are hereby incorporated by reference.

BACKGROUND OF THE INVENTION

1. Field of the Invention

The present invention relates to a portable terminal having a flexible display unit. More particularly, the present invention relates to a display apparatus and method of preventing unnecessary current consumption while improving a battery lifetime of a portable terminal.

2. Description of the Related Art

A portable terminal typically has one or more functions of performing portable audio and video communication, inputting/outputting information, and storing data. As the functions of a portable terminal are diversified, a newer portable terminal, serving as a multimedia player, is equipped with complicated functions, such as capturing of photographs, reproduction of music files or moving image files, games, reception of broadcasts, wireless Internet access, and the like.

More efforts are being made in the hardware or software to implement more complex functions of a portable terminal implemented in the form of a multimedia player. Also, as such a portable terminal is recognized as a personal effect in expressing a user's personality, diverse design choices on both-side LCD and a front surface of the touch screen, and the like, have been demanded. As an example of a user's preference, using the above-described touch screen, the whole area of a portable terminal may be used as a display without a keypad using a touch screen.

Since the portable terminal having the above-described touch screen has a structure in which the area of the display unit cannot be expanded to be wider than the surface area of the portable terminal, there is a need for a technology that can provide a wider screen while minimizing the size of a portable terminal in conjunction with a miniaturization trend.

Recently, a portable terminal having a light thin flexible liquid crystal display unit has been proposed to provide a wider screen, where a liquid crystal display unit is provided on the side surface of the portable terminal to be rolled in during safekeeping and rolled out when in use to provide a display with an aspect ratio that is most familiar to a user. Accordingly, the portable terminal can provide a display which is much wider than the surface of the touch screen, but requires a minimum custody space for accommodating the display unit.

According to the above type portable terminal, however, even in the case where the flexible display unit is rolled or folded by a user, current is constantly supplied to the display portion regardless of the state or mode of the display portion, that is, regardless of whether the display portion is rolled in or expanded out. As a result, as the same current is supplied to the display portion during a rolled in state, unnecessary power is consumed which in turn reduce the battery life time.

SUMMARY OF THE INVENTION

Accordingly, the present invention has been made to solve the above-mentioned problems occurring in the prior art and provides additional advantages, by providing a display apparatus in a portable terminal and its method which can prevent unnecessary current consumption by discriminating the data processing of the whole screen that is displayed on a flexible display unit in correspondence to the degree of expansion of the flexible display unit.

In accordance with an aspect of the present invention, there is provided a display apparatus for a portable terminal, which includes an expandable flexible display unit; a sensing unit including a plurality of magnets, a plurality of sensors sensing the magnets to sense the degree of accommodation of the display unit; and a controller setting pixel values of the sensed display unit.

In accordance with another aspect of the present invention, there is provided a display method for a portable terminal, which includes determining whether at least one of a plurality of sensors fixedly mounted on a display unit of the portable terminal senses magnets when an image is output to the display unit; determining an area of the display unit in which the sensor that has sensed the magnets is arranged; and setting pixel values of the area of the display unit.

In accordance with another aspect of the present invention, there is provided a portable terminal, which includes a housing, a memory coupled to a controller, an expandable display coupled to the controller and expandable from a first size to a second size, the first size being different from the second size, and a sensing unit having a plurality of magnets and a plurality of sensors and senses a change from the first size to the second size as at least one of the plurality of magnets come in contact with at least one of the plurality of sensors, wherein the controller readjusts an output image of the expendable display in response to the change in the display size.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other aspects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings. In the following description, various specific definitions found in the following description are provided only to help general understanding of the present invention, and it should be apparent to those skilled in the art that the present invention can be implemented without such definitions.

A display unit of a portable terminal according to an embodiment of the present invention is implemented in a flexible material that can be bent or rolled. In this case, the display unit may be a flexible LCD or OLED. According to the teachings of the present invention, whether the flexible display unit is in a folded or rolled out state from an accommodation unit is sensed, using flux signals that are sensed through sensors mounted on the display unit, and pixel values of an area representing the amount of display area being accommodated in the accommodation unit are considered to readjust the output image of the display unit in order to prevent unnecessary power consumption.

Also, the portable terminal according to an embodiment of the present invention is preferably a mobile communication terminal, and it will be apparent that the teachings of the present invention is applicable to other information communication devices, multimedia devices, and their applications, such as a digital broadcasting terminal, a PDA (Personal Digital Assistant), a smart phone, a 3G terminal, for example, an IMT-2000 (International Mobile Telecommunication 2000) terminal, a WCDMA (Wideband Code Division Multiple Access) terminal, a GSM/GPRS (Global System for Mobile Communication Packet Radio Service) and UMTS (Universal Mobile Telecommunication Service) terminal, and the like.

A sensor to be described hereinafter is preferably a hall sensor which can sense the change of a magnetic field that is generated due to contacting with, approaching to, or seceding from a magnet, but other sensors known to artisian will be applicable according to the present invention.

Hereinafter, a display apparatus for a portable terminal according to an embodiment of the present invention will be described in detail with reference to FIG. 1.

Figure 1:
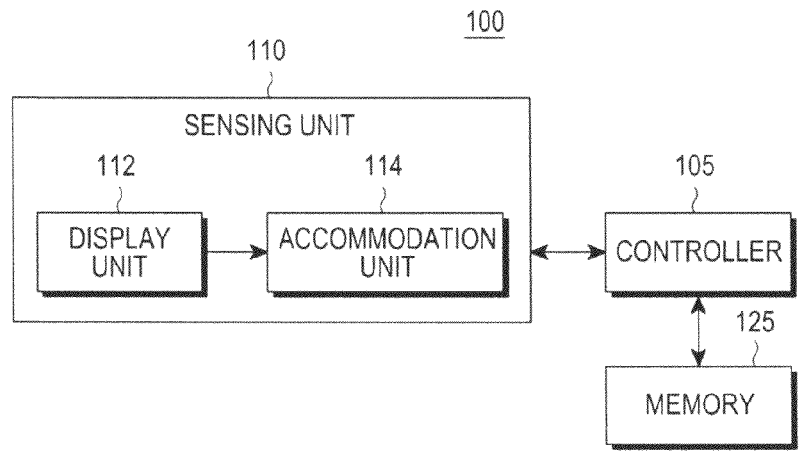
FIG. 1 is a block diagram illustrating the configuration of a display apparatus for a portable terminal according to an embodiment of the present invention.

FIG. 1 is a block diagram illustrating the configuration of a display apparatus 100 for a portable terminal according to an embodiment of the present invention. As shown, the display device 100 includes a controller 105, a memory 125 and a sensing unit 110. The sensing unit 100 includes a display unit 112 and an accommodation unit 114 so that the display unit 112 can be rolled up in the accommodation unit 114. In an alternate embodiment, the sensing unit can be a separate unit from the display unit 112 and the accommodation unit 114. In addition, the display device 100 may further include a camera, a speaker, a wireless communication unit, a memory, and the like.

The sensing unit 110 includes a display unit 112 and an accommodation unit 114. The display unit 112 is an expandable flexible display unit of which the screen can be rolled up or bent like a paper, and flexible TFT LCD (Thin Film Transistor LCD), OLED (Organic Light Emitting Diodes), e-paper, and LITI (Laser Induced Thermal Image) technologies may be used for the display unit.

The accommodation unit 114 accommodates the display unit 112 in a rolled out or folded state.

In the embodiment of the present invention, the accommodation unit 114 may be in the form of a cylinder that is rotatable about a shaft formed in the center, and in this case, a user can adjust the size of a screen for the display area of the display unit 112 by drawing and expanding the display unit 112 out of the accommodation unit 114 or accommodating the display unit 112 in a rolled state in the accommodation unit 114.

Also, the accommodation unit 114 may be in the form in which the display unit 114 can be folded or bent around the shaft formed in the center of the display unit 114 like a paper, and in this case, the user can adjust the size of the screen for the display area of the display unit 112 by folding or unfolding the display unit 112 around the accommodation unit 114. That is, using the accommodation unit 114, the display unit 112 can be moved more naturally.

More specifically, the sensing unit 110 includes a plurality of magnets fixedly mounted on the accommodation unit 114, and a plurality of sensors mounted on the display unit 112 to sense the magnets and to generate sensing signals as the display unit 112 is accommodated in the accommodation unit 114.

In this case, the sensor may be a hall sensor which reacts on the strength of the magnetic field. The hall sensors are mounted on the display unit 112 of the portable terminal. Also, as the display unit 112 is accommodated in the accommodation unit 114 or secedes from the accommodation unit 114 to be expanded outwardly, the hall sensors approach to, contact, or secede from the magnets mounted on the accommodation unit 114, and thus the change of the magnetic field at that time can be sensed by the hall sensors.

That is, when the display unit 112 accommodated in the accommodation unit 114 is expanded or retracted, at least one sensor among the plurality of sensors mounted on the display unit 112 comes in contact with at least one magnet among the plurality of magnets mounted on the accommodation unit 114 which in turn generates a flux signal. Thus, the corresponding area of the display unit, defined by where the magnet is sensed, for a newer viewing after the display is moved/shift can be sensed through the flux signal.

Here, specified areas of the display unit 112 are preset for the respective sensors which are arranged at predetermined intervals on the display unit 112. For example, if a first sensor among the plurality of sensors senses the magnet and generates a sensing signal, an area of the display unit that is preset for the first sensor is confirmed, and an operation for the corresponding area is performed.

Alternatively, the plurality of sensors mounted on the display unit 112 are arranged on one side of the display unit 112 at the same intervals as the plurality of magnets mounted on the accommodation unit 114.

Then, the controller 105 typically controls the whole operation of the portable terminal.

Also, the controller 105 sets pixel values for the specified area of the display unit 112 sensed by the sensing unit 110. In other words, the controller 105 processes the pixel values of the area of the display unit 112 sensed by the sensing unit 110 as black data as the display unit 112 is accommodated in the accommodation unit 114.

In operation, when an image is output to the display area of the display unit 112, the controller 105 processes an input image, which corresponds to an area of the display unit 112 that is accommodated in the accommodation unit 114 in a folded or rolled out state, as black data. The output image is then readjusted by taking in account of the black data. The current to power the output image of the display unit is reduced according to the amount of black data being recognized in the display unit, thus unnecessary power consumption for the area that the user cannot view is prevented.

FIGS. 4A to 4D are exemplary views of screens simulated in order to facilitate the understanding of the present invention as mentioned above.

The current consumption when the input image that is displayed on an area of the display unit 112 that is accommodated in the accommodation unit 114 is processed as black data, and the current consumption when the input image that is displayed on other areas of the display unit 112 is normally processed. This scenario was actually simulated and the result of simulation is illustrated in FIGS. 4A to 4D.

Figures 4A, 4B, 4C, 4D:
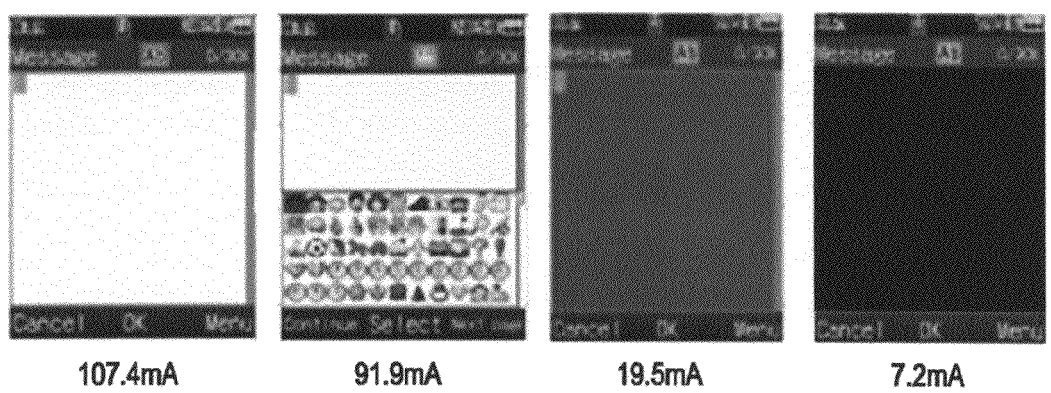
FIGS. 4A to 4D are exemplary views of screens simulated by applying a display method for a portable terminal according to an embodiment of the present invention.

First, FIG. 4A illustrates a case where the input image on the whole display area of the display unit is processed as white data, FIG. 4B illustrates a case where the input image on one portion of the display area of the display unit is processed as white data and the input image on the other portion thereof is processed as data having an intermediate level between black and white, FIG. 4C illustrates a case where the input image on the whole display area of the display unit is processed as data having a gray level that is close to black, and FIG. 4D illustrates a case where the input image on the whole display area of the display unit is processed as black data. It can be seen from FIGS. 4A to 4D that the corresponding current value is gradually reduced as the level of the processed data as black becomes greater as less current power is needed to illuminate the screen.

By incorporating above configurations, in the inventive embodiment, the controller 105 performs re-sizing of the output image by changing the aspect ratio/area of the output image that is displayed on the display unit 112 in correspondence to the degree of expansion of the display unit 112 from the accommodation unit 114 by the user as the different level of expansion yields different amount of black data. A more detailed description of the invention will be explained hereinafter with reference to FIGS. 2, 3A and 3B.

Figure 2:
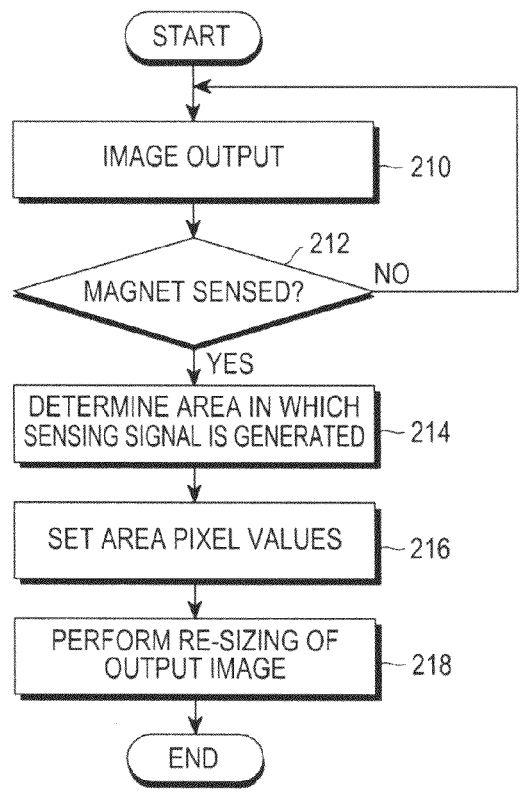
FIG. 2 is a flowchart illustrating a display method for a portable terminal according to an embodiment of the present invention.
Figure 3A:
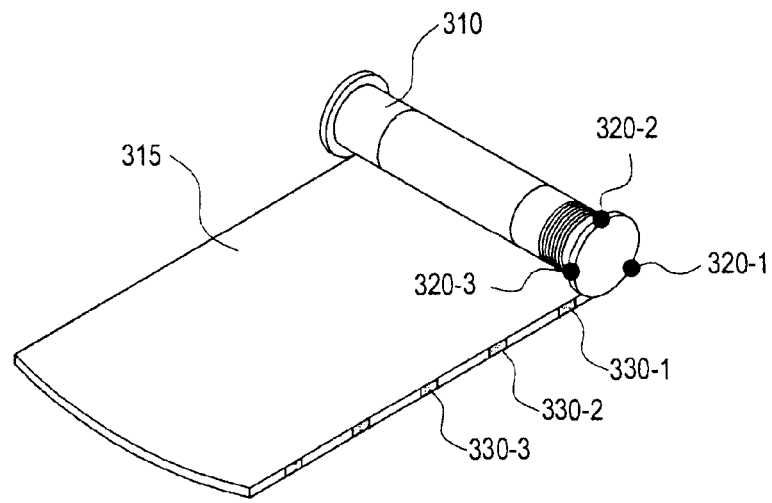
FIGS. 3A and 3B are exemplary views of a portable terminal to which a display method for a portable terminal according to an embodiment of the present invention is applied.
Figure 3B:
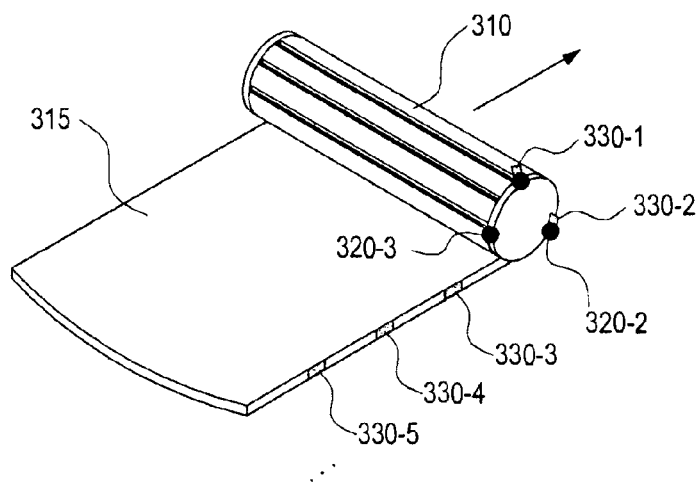

FIG. 2 is a flowchart illustrating a display method for a portable terminal according to an embodiment of the present invention, and FIGS. 3A and 3B are exemplary views of a portable terminal to which a display method for a portable terminal according to an embodiment of the present invention is applied.

First, referring to FIG. 2, in step 210, a specified image is displayed on the display unit of the portable terminal.

In step 212, it is determined whether at least one of the plurality of sensors fixedly mounted on the display unit of the portable terminal senses magnets as the display unit expands or retracts.

Referring to FIG. 3A, the process of determining whether the sensors sense the magnets is performed by sensing corresponding areas of the display unit on which the respective sensors are arranged through the flux signal that is generated as the sensors 330-1, 330-2, 330-3, and the like, mounted on one side of the display unit 315 of the portable terminal come in contact with the magnets 320-1, 320-2, 320-3, and the like.

That is, as illustrated in FIG. 3B, as the user houses the display unit 315 in the accommodation unit 310, the areas of the display unit 315 that are preset for the sensors 330-1 and 330-2 are read from a memory using the flux signal that is generated as the sensors 330-1 and 330-2 among the sensors mounted on the display unit 315 come in contact with the magnets 320-1 and 320-2 among the magnets mounted on the accommodation unit 310, and thus it is recognized that the specified area of the display unit 315 has been housed in the accommodation unit 310.

Referring back to FIG. 2, if the magnet is sensed as a result of determination in step 212, the processing proceeds to step 214, and the display area in which the sensing signal is generated by the sensed magnet is determined.

As described above with reference to FIGS. 3A and 3B, specified areas of the display unit 112 are preset for the respective sensors which are arranged at predetermined intervals on the display unit, and for example, if a first sensor senses the magnet and generates a sensing signal, the operation in step 214 is performed by recognizing the corresponding area of the display unit that is preset for the first sensor.

In step 216, pixel values for the display area are set based on the outcome of step 214, meaning processing the black data where an input image with respect to the area of the corresponding display unit accommodated in the accommodation unit 114 is processed as black data. That is, as a portion of the display unit is housed in the accommodation unit, the input image on the corresponding display area of the display unit that is housed in the accommodation unit is processed as black data. This is to prevent unnecessary power consumption for the area that the user cannot view since recognized black data requires less current.

Thereafter, in step 218, the re-sizing of the output image is performed by changing the aspect ratio/area of the output image that is displayed on the display unit in correspondence to the degree of expansion of the display unit 112 except for the area in which the input data is processed as black data. For example, the aspect ratio of an image is the ratio of the width of the image to its height, typically expressed as two numbers separated by a colon. So from 4:5, it can be changed to 4:3 when a portion of rolled since the black data is not considered. When the aspect ratio is changed by disregarding area corresponding to the black data, less power is needed to power the display unit since the area of display is reduced. That is, the re-sizing is performed when the display unit is accommodated in the accommodation unit 114, so the image outputted before the display unit 112 is accommodated, is accommodated in the accommodation unit 114, thereby the output image is re-adjusted in the display unit 112 which is not accommodated in the accommodation unit 114. Therefore, the area of corresponding unit 112 accommodated in the accommodation unit 114 is processed as the black data, so power consumption is decreased in steps 216 and 218 at the same time.

As described above, a single-body type flexible display unit is provided on one side surface of the whole panel to form a single display window, and when the display unit is rolled or folded on the accommodation unit, the display unit of the portable terminal is not exposed for viewing. In operation, the area of the display unit that is accommodated in the accommodation unit is recognized using the magnets mounted on the portable terminal and the sensors for sensing the magnets, and the corresponding pixel values are adjusted based on the amount of black data recognized as the display unit expands/retracts from one size to another size. Accordingly, unnecessary current consumption is prevented and thus the battery duration time of the portable terminal can be improved.

That is, the output image of the display is adjusted and current supply to the display unit is discriminated according to the degree of expansion of the display unit using magnets mounted on the portable terminal and sensors to determine the amount of change in the display unit area for viewing.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the operation and configuration of the display apparatus and method for a portable terminal have been shown and described with reference to certain exemplary embodiments thereof, it will be understood by those skilled in the art that various changes in form and details may be made therein without departing from the spirit and scope of the invention as defined by the appended claims.

What is claimed is:

1. A display apparatus for a portable terminal, comprising:
an expandable display unit;
a sensing unit including a plurality of magnets and a plurality of sensors sensing at least one of the plurality of magnets to sense an area of the display unit which is hidden from view; and
a controller setting pixel values of the sensed display unit;
wherein the sensing unit senses the area of the display unit hidden from view by sensing a corresponding area of the display unit in which the respective sensors are arranged through flux signals that are generated as the at least one of the plurality of magnets mounted on an accommodation unit comes in contact with at least one of the sensors mounted on the display unit.

2. The display apparatus of claim 1, wherein pixel values of an area that is hidden from view are set as pixel values corresponding to black.

3. The display apparatus as claimed in claim 1, wherein the sensor is a hall sensor which senses the change of a magnetic field that is generated as the sensor approaches the at least one of the plurality of magnets.

4. The display apparatus as claimed in claim 1, wherein the plurality of sensors are arranged on one side of the display unit at the same intervals as the plurality of magnets mounted on the accommodation unit.

5. The display apparatus as claimed in claim 1, wherein an aspect ratio/area of an output image that is displayed on the display unit is adjusted according to the degree of expansion of the display unit.

6. A display method for a portable terminal, comprising:
determining whether at least one of a plurality of sensors fixedly mounted on an expandable display unit of the portable terminal senses at least one of a plurality of magnets provided around an accommodation unit when an image is output to the display unit;
determining an area of the display unit that corresponds to where the at least one of the plurality of sensors senses at least one of the plurality of magnets; and
setting pixel values of the area of the display unit according to the determined area of the display unit,
wherein the sensors are arranged on at least one side of the display unit at the same intervals as the magnets mounted on at least one side of the accommodation unit, the display unit is rotatable around the accommodation unit in more than one revolution, and the number of sensors arranged at the same intervals as the magnets exceeds the number of magnets.

7. The display method as claimed in claim 6, further comprising re-sizing the output image on the display unit if at least one of the plurality of magnets is sensed by the least one of the plurality of sensors.

8. The display method as claimed in claim 6, wherein the display unit is a flexible display unit accommodated in the accommodation unit and expandable therefrom.

9. A portable terminal, comprising:
a memory coupled to a controller;
a display having an expandable display area, the display being coupled to the controller and the display area being expandable from a first size to a second size; and
a sensing unit having a plurality of magnets and a plurality of sensors and senses a change from the second size to the first size as at least one of the plurality of magnets comes in contact with at least one of the plurality of sensors, wherein the controller readjusts an output image of the display in response to the change.

10. The portable terminal as claimed in claim 9, further comprising an accommodation unit accommodating the display having an expandable display area.

11. The portable terminal as claimed in claim 10, wherein the plurality of magnets is mounted on the accommodation unit and the plurality of sensors is mounted on the display having the expandable display area.

12. The portable terminal as claimed in claim 9, wherein the controller processes pixel values of an area of the display as pixel values corresponding to black as the display area changes from the first size to the second size.

13. The portable terminal as claimed in claim 9, wherein the sensing unit senses a change in flux signals that are generated as the at least one of the plurality of magnets mounted on an accommodation unit come in contact with the least one of the plurality of sensors which are mounted on the expandable display.

14. The portable terminal as claimed in claim 9, wherein the sensor is a hall sensor which senses the change of a magnetic field that is generated as the change occurs from the second size to the first size.

15. The portable terminal as claimed in claim 9, wherein an aspect ratio/area of the output image that is readjusted for a display is based on the change from the second size to the first size.

16. A display apparatus for a portable terminal, comprising:
an expandable display unit;
a sensing unit including a plurality of magnets and a plurality of sensors sensing at least one of the plurality of magnets to sense an amount of area of the display unit that is hidden from view;
a controller setting pixel values of the sensed display unit according to the sensed amount of area of the display unit that is hidden from view; and
an accommodation unit configured to accommodate the display unit;
wherein,
the magnets are mounted on the accommodation unit and the sensors are mounted on the display unit, the sensors being arranged on at least one side of the display unit at the same intervals as the magnets mounted on at least one side of the accommodation unit; and
the display unit is rotatable around the accommodation unit in more than one revolution, and the number of sensors arranged at the same intervals as the magnets exceeds the number of magnets.

* * * * *